(12) United States Patent
Heath

(10) Patent No.: US 8,667,532 B2
(45) Date of Patent: Mar. 4, 2014

(54) CONTENT RECOGNITION FOR TARGETING VIDEO ADVERTISEMENTS

(75) Inventor: Taliver Brooks Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 447 days.

(21) Appl. No.: 11/736,972

(22) Filed: Apr. 18, 2007

(65) Prior Publication Data

US 2008/0263583 A1    Oct. 23, 2008

(51) Int. Cl.
*H04N 7/10* (2006.01)
*H04N 7/025* (2006.01)

(52) U.S. Cl.
USPC ............... 725/36; 725/32; 705/10; 705/14

(58) Field of Classification Search
USPC .............. 725/32, 33, 34, 35, 36; 705/10, 14
See application file for complete search history.

(56) References Cited

U.S. PATENT DOCUMENTS

| | | |
|---|---|---|
| 5,649,060 A | 7/1997 | Ellozy |
| 5,664,227 A | 9/1997 | Mauldin et al. |
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,091,416 A | 7/2000 | Cragun |
| 6,144,944 A | 11/2000 | Kurtzman, II et al. |
| 6,167,382 A | 12/2000 | Sparks et al. |
| 6,188,398 B1 | 2/2001 | Collins-Rector et al. |
| 6,269,361 B1 | 7/2001 | Davis et al. |
| 6,282,548 B1 | 8/2001 | Burner et al. |
| 6,282,713 B1 | 8/2001 | Kitsukawa et al. |
| 6,393,158 B1 | 5/2002 | Gould et al. |
| 6,401,075 B1 | 6/2002 | Mason et al. |
| 6,615,270 B2 | 9/2003 | Gould et al. |
| 6,621,980 B1 | 9/2003 | Gould et al. |
| 6,698,020 B1 | 2/2004 | Zigmond et al. |

(Continued)

FOREIGN PATENT DOCUMENTS

| | | |
|---|---|---|
| CN | 1728781 | 2/2006 |
| CN | 102113009 | 6/2011 |

(Continued)

OTHER PUBLICATIONS

Control No. 95/001,061, Reexamination of Stone, et al.

(Continued)

*Primary Examiner* — Nnenna Ekpo
(74) *Attorney, Agent, or Firm* — Fish & Richardson P.C.

(57) ABSTRACT

Methods, systems, and apparatus, including computer program products, for providing advertisements. A plurality of advertisement targeting criteria is determined from a video stream or file. A first advertisement targeting criterion of the advertisement targeting criteria is associated with a first time position in the video. A second advertisement targeting criterion of the advertisement targeting criteria is associated with a second time position in the video. One or more first advertisements are provided, for presentation at or after the first time position in the video, based on the first advertisement targeting criterion. One or more second advertisements are provided, for presentation at or after the second time position in the video, based on the second advertisement targeting criterion.

21 Claims, 7 Drawing Sheets

(56) References Cited

U.S. PATENT DOCUMENTS

| | | |
|---|---|---|
| 6,771,290 B1 | 8/2004 | Hoyle |
| 6,847,977 B2 | 1/2005 | Abajian |
| 6,978,470 B2 | 12/2005 | Swix et al. |
| 6,985,882 B1 | 1/2006 | Del Sesto |
| 6,990,496 B1 | 1/2006 | McGee, III et al. |
| 6,996,564 B2 | 2/2006 | Lester et al. |
| 7,039,599 B2 | 5/2006 | Merriman |
| 7,043,746 B2* | 5/2006 | Ma .................................. 725/22 |
| 7,055,103 B2 | 5/2006 | Lif |
| 7,058,963 B2 | 6/2006 | Kendall et al. |
| 7,136,875 B2 | 11/2006 | Anderson et al. |
| 7,158,966 B2 | 1/2007 | Brill et al. |
| 7,158,986 B1 | 1/2007 | Oliver et al. |
| 7,165,069 B1 | 1/2007 | Kahle et al. |
| 7,181,447 B2 | 2/2007 | Curtis et al. |
| 7,194,527 B2 | 3/2007 | Drucker et al. |
| 7,266,198 B2 | 9/2007 | Medvinsky |
| 7,383,258 B2 | 6/2008 | Harik et al. |
| 7,454,509 B2 | 11/2008 | Boulter et al. |
| 7,467,218 B2 | 12/2008 | Gould et al. |
| 7,506,356 B2 | 3/2009 | Gupta et al. |
| 7,559,017 B2 | 7/2009 | Datar et al. |
| 7,584,490 B1* | 9/2009 | Schlack .......................... 725/35 |
| 7,657,519 B2 | 2/2010 | Anderson et al. |
| 7,769,819 B2 | 8/2010 | Lerman et al. |
| 7,806,329 B2 | 10/2010 | Dmitriev et al. |
| 7,809,802 B2 | 10/2010 | Lerman et al. |
| 7,853,601 B2 | 12/2010 | Kadambi et al. |
| 7,966,632 B1 | 6/2011 | Pan et al. |
| 7,986,372 B2 | 7/2011 | Ma et al. |
| 8,156,010 B2 | 4/2012 | Gopalakrishnan |
| 8,156,176 B2 | 4/2012 | Lerman et al. |
| 8,196,166 B2 | 6/2012 | Roberts et al. |
| 8,243,017 B2 | 8/2012 | Brodersen et al. |
| 2001/0003214 A1 | 6/2001 | Shastri et al. |
| 2002/0002525 A1 | 1/2002 | Arai et al. |
| 2002/0116716 A1 | 8/2002 | Sideman |
| 2002/0147782 A1 | 10/2002 | Dimitrova et al. |
| 2002/0194195 A1 | 12/2002 | Fenton et al. |
| 2003/0061305 A1 | 3/2003 | Copley et al. |
| 2003/0154128 A1 | 8/2003 | Liga et al. |
| 2003/0188308 A1* | 10/2003 | Kizuka .......................... 725/32 |
| 2004/0059708 A1 | 3/2004 | Dean et al. |
| 2004/0133910 A1 | 7/2004 | Gordon et al. |
| 2004/0163101 A1 | 8/2004 | Swix et al. |
| 2004/0226038 A1* | 11/2004 | Choi .................................. 725/32 |
| 2004/0267806 A1 | 12/2004 | Lester et al. |
| 2005/0028190 A1 | 2/2005 | Rodriguez et al. |
| 2005/0034151 A1 | 2/2005 | Abramson |
| 2005/0071224 A1 | 3/2005 | Fikes et al. |
| 2005/0091311 A1 | 4/2005 | Lund et al. |
| 2005/0114198 A1 | 5/2005 | Koningstein et al. |
| 2005/0120127 A1 | 6/2005 | Bradley et al. |
| 2005/0207442 A1 | 9/2005 | Zoest et al. |
| 2006/0013555 A1 | 1/2006 | Poslinski |
| 2006/0015904 A1 | 1/2006 | Marcus |
| 2006/0026628 A1 | 2/2006 | Wan et al. |
| 2006/0053470 A1 | 3/2006 | Colter et al. |
| 2006/0059510 A1 | 3/2006 | Huang et al. |
| 2006/0090182 A1 | 4/2006 | Horowitz et al. |
| 2006/0106709 A1 | 5/2006 | Chickering et al. |
| 2006/0129533 A1 | 6/2006 | Purvis |
| 2006/0140584 A1 | 6/2006 | Ellis et al. |
| 2006/0179453 A1* | 8/2006 | Kadie et al. ...................... 725/34 |
| 2006/0214947 A1 | 9/2006 | Boose et al. |
| 2006/0221222 A1 | 10/2006 | Hirasawa |
| 2006/0224496 A1 | 10/2006 | Sandholm et al. |
| 2006/0224693 A1 | 10/2006 | Gaidemak et al. |
| 2006/0259588 A1 | 11/2006 | Lerman et al. |
| 2006/0259589 A1 | 11/2006 | Lerman et al. |
| 2006/0271977 A1 | 11/2006 | Lerman et al. |
| 2006/0277567 A1 | 12/2006 | Kinnear |
| 2007/0073579 A1 | 3/2007 | Immorlica et al. |
| 2007/0078708 A1 | 4/2007 | Yu et al. |
| 2007/0078709 A1* | 4/2007 | Rajaram ........................ 705/14 |
| 2007/0089127 A1* | 4/2007 | Flickinger et al. ............... 725/32 |
| 2007/0100690 A1 | 5/2007 | Hopkins |
| 2007/0101365 A1 | 5/2007 | Clark et al. |
| 2007/0112630 A1 | 5/2007 | Lau et al. |
| 2007/0113240 A1 | 5/2007 | McLean et al. |
| 2007/0130602 A1 | 6/2007 | Gulli et al. |
| 2007/0146549 A1 | 6/2007 | Suh |
| 2007/0157228 A1 | 7/2007 | Bayer et al. |
| 2007/0159522 A1 | 7/2007 | Neven |
| 2007/0204310 A1* | 8/2007 | Hua et al. ........................ 725/88 |
| 2007/0245242 A1 | 10/2007 | Yagnik |
| 2007/0277205 A1 | 11/2007 | Grannan |
| 2007/0282893 A1 | 12/2007 | Smith et al. |
| 2007/0282906 A1 | 12/2007 | Gabriel |
| 2007/0288950 A1 | 12/2007 | Downey et al. |
| 2007/0299870 A1* | 12/2007 | Finch ........................ 707/104.1 |
| 2008/0004948 A1 | 1/2008 | Flake et al. |
| 2008/0005166 A1 | 1/2008 | Cragun et al. |
| 2008/0019610 A1 | 1/2008 | Matsuzaka et al. |
| 2008/0021775 A1 | 1/2008 | Lerman et al. |
| 2008/0027798 A1 | 1/2008 | Ramamurthi et al. |
| 2008/0033806 A1 | 2/2008 | Howe et al. |
| 2008/0066107 A1 | 3/2008 | Moonka et al. |
| 2008/0092182 A1 | 4/2008 | Conant |
| 2008/0098420 A1 | 4/2008 | Khivesara et al. |
| 2008/0155585 A1* | 6/2008 | Craner et al. .................... 725/32 |
| 2008/0163071 A1 | 7/2008 | Abbott et al. |
| 2008/0189169 A1 | 8/2008 | Turpin et al. |
| 2008/0201361 A1 | 8/2008 | Castro et al. |
| 2008/0229353 A1 | 9/2008 | Morris et al. |
| 2008/0235722 A1* | 9/2008 | Baugher et al. .................. 725/32 |
| 2008/0249855 A1 | 10/2008 | Collins et al. |
| 2008/0276266 A1 | 11/2008 | Huchital et al. |
| 2008/0300974 A1 | 12/2008 | Bhandari et al. |
| 2008/0306999 A1 | 12/2008 | Finger et al. |
| 2009/0006375 A1 | 1/2009 | Lax et al. |
| 2009/0049469 A1 | 2/2009 | Small et al. |
| 2009/0055375 A1 | 2/2009 | Oestlien et al. |
| 2009/0070836 A1 | 3/2009 | Aaby et al. |
| 2009/0165041 A1 | 6/2009 | Penberthy et al. |
| 2010/0037149 A1 | 2/2010 | Heath |
| 2010/0174607 A1 | 7/2010 | Henkin et al. |
| 2010/0186028 A1 | 7/2010 | Moore et al. |
| 2010/0278453 A1 | 11/2010 | King |
| 2011/0131595 A1 | 6/2011 | Xue et al. |
| 2011/0289531 A1 | 11/2011 | Moonka et al. |

FOREIGN PATENT DOCUMENTS

| | | |
|---|---|---|
| JP | 2003-242372 | 8/2003 |
| JP | 2006-155384 | 6/2006 |
| KR | 10-2006-0099253 | 9/2006 |
| WO | WO 97/21183 | 6/1997 |
| WO | WO 99/36918 | 7/1999 |
| WO | WO 99/66719 | 12/1999 |
| WO | WO 01/50296 | * 7/2001 |
| WO | WO0150296 | 7/2001 |
| WO | WO 03/084219 | 10/2003 |
| WO | WO 2006/111912 | 10/2006 |
| WO | WO 2008/072874 | 6/2008 |

OTHER PUBLICATIONS

Control No. 95/001,068, Reexamination of Stone, et al.
Control No. 95/001,069, Reexamination of Dean, et al.
Control No. 95/001,073, Reexamination of Stone, et al.
AdForce, Inc., A Complete Guide to AdForce, Version 2.6, 1998.
AdForce, Inc., S-1/A SEC filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org., Apr. 12, 1997, and Feb. 1, 1997.
Baseview Products, Inc., ClassManagerPro Administration Manual v. 1.0.5, Feb. 1, 1997.
Baseview Products, Inc., AdManagerPro Administration Manual v. 2.0, Dec. 1998.

(56) References Cited

OTHER PUBLICATIONS

Business Wire, "Global Network, Inc. Enters into Agreement in Principle with Major Advertising Agency," Oct. 4, 1999.
Dedrick, R., "Interactive Electronic Advertising," IEEE, 1994.
Dedrick, R., "A Consumption Model for Targeting Electronic Advertising," Intel Architecture Labs, IEEE, 1995.
Greg Sandoval: "YouTube: Too rough for advertisers?" [online] [retrieved on Apr. 21, 2006]. Retrieved from the Internet: < URL: http://www.news.com >, 2 pages.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Masashi Honda, International Preliminary Report on Patentability in PCT/US2008/060859, mailed Oct. 29, 2009, 6 pages.
Dorothée Mülhausen, International Preliminary Report on Patentability in PCT/US2007/078299, mailed Mar. 26, 2009, 14 pages.
So Young Doo, International Search Report and the Written Opinion in PCT/US2008/060859, mailed Sep. 26, 1008, 10 pages.
Raoul Emme, International Search Report and the Written Opinion in PCT/US2007/078299, mailed May 2, 2008, 29 pages.
Jung Jin Kim, International Search Report and the Written Opinion in PCT/US2009/052866, mailed Mar. 18, 2010, 11 pages.
Request for Reexamination of U.S. Patent No. 6,446,045 B1, Control No. 95/001,061.
Request for Reexamination of U.S. Patent No. 6,829,587 B2, Control No. 95/001,068.
Request for Reexamination of U.S. Patent No. 7,249,059 B2, Control No. 95/001,069.
Request for Reexamination of U.S. Patent No. 7,240,025 B2, Control No. 95/001,073.
Zeff, R., et al., "Advertising on the Internet," $2^{nd}$ Ed., John Wiley & Sons, 1999.
Lowe, D.G., "Object Recognition from Local Scale-Invariant Features," *Proc. Seventh IEEE Int'l Conf on Computer Vision ICCV 99*, Kerkyra, Greece, Sep. 20-27, 1999, pp. 1150-1157.
Authorized officer Simin Baharlou, International Preliminary Report on Patentability in PCT/US2009/052866, mailed Feb. 17, 2011, 7 pages.
Supplementary EP Search Report in EP 09 80 5508, mailed Nov. 3, 2011, 5 pages.
Supplementary EP Search Report in EP 08 74 6298, mailed Jan. 23, 2012, 7 pages.
Office Action for Chinese Patent Application No. 200980130845.X, dated Dec. 27, 2011, 17 pages.
U.S. Appl. No. 11/240,794, Filed Sep. 30, 2006, Using Negative User Feedback Information, Such as Advertisement Close Rate, in Scoring and/or Pricing Online Advertisements.
U.S. Appl. No. 11/438,473, Filed May 22, 2006, Estimating Video Ad Performance.
U.S. Appl. No. 12/028,710, Filed Feb. 8, 2008 User Interaction Based Related Videos He et al.
U.S. Appl. No. 12/029,140, Filed Feb. 11, 2008 Associating Advertisements with Videos Seth et al.
U.S. Appl. No. 12/637,635, Filed Dec. 14, 2009 Target-Video Specific Co-Watched Video Clusters He et al.
U.S. Appl. No. 13/619,961, Filed Sep. 14, 2012 Selection of Advertisements for Placement with Content Lax et al.
U.S. Appl. No. 13/620,191, Filed Sep. 14, 2012 Content Recognition for Targeting Video Advertisements Heath.
EP Communication from European Application No. 08781112.1 mailed Oct. 26, 2010, 4 pages.
European Search Report issued in International Application No. 08756776.4 on Apr. 20, 2001, 3 pages.
Communication Pursuant to Article 94(3) EPC issued in International Application No. 08756776.4 on Apr. 29, 2011, 7 pages.
PCT International Search Report and Written Opinion, PCT/US2008/062442, Jul. 14, 2008.
PCT International Search Report and Written Opinion, PCT/US2008/062103, Aug. 26, 2008.
International Search Report and Written Opinion for PCT Application No. PCT/US2008/068624, dated Aug. 4, 2009, 12 pages.
International Preliminary Report on Patentability issued in International Application No. PCT/US2008/062103 on Nov. 3, 2009, 6 pages.
International Preliminary Report on Patentability issued in International Application No. PCT/US2008/062442 on Nov. 3, 2009, 7 pages.
International Preliminary Report on Patentability issued in International Application No. PCT/US2008/066175 on Dec. 11, 2009, 7 pages.
Baluj a et al. "Video Suggestion and Discovery for YouTube: Taking Random Walks through the View Graph", ACM, WW 2008, Apr. 21-25, 2008.
International Preliminary Report on Patentability for PCT Application No. PCT/US2008/066175, mailed Dec. 23, 2009, 7 pgs.
International Search Report and Written Opinion from International Application No. PCT/US08/66175, mailed Jun. 9, 2009, 8 pgs.
International Preliminary Report on Patentability from International Application No. PCT/US2008/073914, mailed Mar. 4, 2010, 7 pgs.
International Search Report and Written Opinion from International Application No. PCT/US2008/073914 mailed Jun. 23, 2009, 14 pgs.
Mahesh Dwivedi, International Preliminary Report on Patentability for PCT Application No. PCT/US2008/068624, dated Jan. 5, 2010, 6 pages.
Chinese Office Action in Chinese Application No. 200980130845.X, dated Dec. 27, 2011, 17 pages.
PC World, Steve Bass's Tips & Tweaks., http//blogs.pcworld.com/tipsandtweaks/archives/006418/html, downloaded Feb. 14, 2011, 2 pages.
"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.
"www.Scanscout.com," 2 pp., Archived on Apr. 07, 2007 on web.archive.org [online][Tretived on Oct. 19, 2009] Retrived from the internet: <URL:http://web.archive.org/web/20070407233129/http://www.scanscout.com>.
"www.BrightRoll.com," 2 pages, Archived on Apr. 29, 2007 on web.archive.org [online] [Retrieved on Oct. 19, 2009] Retrieved from the internet: <URL:http://web.archive.org/web/20070429110654/http://www.birghtroll.com>.
AJAX Activity Indicators, Archived on Dec. 25, 2006 on www.web.archive.org [online] [Retrieved on Jun. 10, 2008] Retrieved from the internet <URL:http://web.archive.org/web/20061225134638/http://www/napyfab.com/ajax-indicators/>.
Strange, Adario, "VideoEgg Exec: YouTube's New Ads are Just Like Ours," [online], [Retrieved Jun. 2008, pp. 1-8,] Retrieved from the internet <URL://http://blog.wired.com/business/2007/08/network-wars-vi.html>.
"Overlay & Video AdType," ScanScout, 2007, [online] [Retrieved on Jul. 15, 2008] Retrieved from the internet <URL://demo.scanscount.com/livedemo.shtml?adType=overlay&videoAdType=rightSide &ss . . . >.
Riley, D., "Contextual In-Video Advertising: ScanScout," May 14, 2007, [online] [Retrieved on Jul. 15, 2008] Retrieved from the internet <URL://www.techcrunch. com/2007/05/14/contextual-in-video- advertising-scanscout/.>.
Delaney, Kevin J., "Start-Ups See to Cash in on Web-Video Ads", Wall Street Journal, Mar. 2, 2007, [online] [Retrieved Sep. 3, 2008] Retrieved from the internet <URL://www.scanscout.com/wsj-070302.html>.
"www.YuMe.com," 2009, 1 page [online][Retrieved on Oct. 19, 2009] Retrieved from the internet: <URL:http://www.yume.com/>.
Examiner Eric Gerard, Communication pursuant to Article 94(3) EPC for EP Appl. No. EP 07 842 355.5—1502 dated Mar. 14, 2013, 6 pages.
Japanese Second Office Action for JP 2009-528455 dated Jun. 18, 2013, English translation, 4 pages.

\* cited by examiner

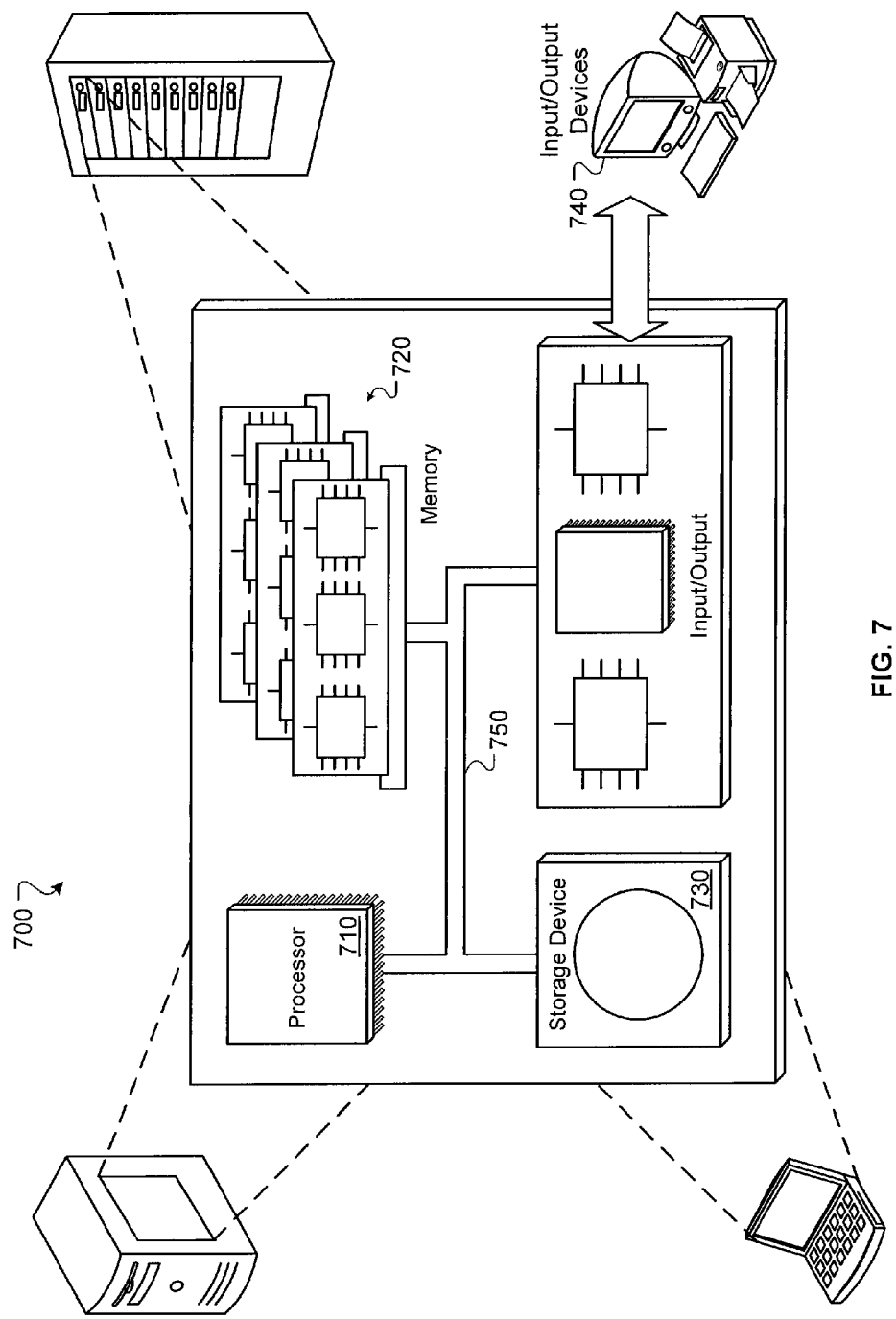

CONTENT RECOGNITION FOR TARGETING VIDEO ADVERTISEMENTS

BACKGROUND

This specification relates to advertising.

Online video is a growing medium. The popularity of online video services reflects this growth. Advertisers see online video as another way to reach their customers. Many advertisers are interested in maximizing the number of actions (e.g., impressions and/or click-throughs) for their advertisements. To achieve this, advertisers make efforts to target advertisements to content, such as videos, that are relevant to their advertisements.

When an advertiser wishes to target advertisements to a video, the advertiser can target the advertisements to the video as a whole. For example, if videos are classified into categories, the advertiser can target advertisements to the videos based on the categories.

Targeting the video as a whole, however, may not be optimal for all situations. The subject matter of a video can change within the duration of the video. An advertisement that is relevant to subject matter that is presented at one point in the video may not be as relevant to subject matter that is presented at another point in the video.

SUMMARY

In general, one aspect of the subject matter described in this specification can be embodied in methods that include the actions of determining a plurality of advertisement targeting criteria from a video stream or file, associating a first advertisement targeting criterion of the advertisement targeting criteria with a first time position in the video, associating a second advertisement targeting criterion of the advertisement targeting criteria with a second time position in the video, providing one or more first advertisements based on the first advertisement targeting criterion for presentation at or after the first time position in the video, and providing one or more second advertisements based on the second advertisement targeting criterion, for presentation at or after the second time position in the video. Other embodiments of this aspect include corresponding systems, apparatus, and computer program products.

In general, another aspect of the subject matter described in this specification can be embodied in methods that include the actions of receiving a video stream or file and one or more advertisement targeting criteria associated with the video stream or file, where the advertisement targeting criteria includes a first targeting criterion associated with a first time position in the video and a second targeting criterion associated with a second time position in the video, identifying one or more first advertisements based on the first targeting criterion, identifying one or more second advertisements based on the second targeting criterion, providing the identified first advertisements for presentation at or after the first time position in the video, and providing the identified second advertisements for presentation at or after the second time position in the video. Other embodiments of this aspect include corresponding systems, apparatus, and computer program products.

In general, another aspect of the subject matter described in this specification can be embodied in methods that include the actions of receiving a video stream or file and one or more advertisement targeting criteria associated with the video, where the advertisement targeting criteria includes a first advertisement targeting criterion associated with a first time position in the video, identifying the first advertisement targeting criterion, requesting one or more first advertisements associated with the first advertisement targeting criterion, receiving the first advertisements, playing back the video, and presenting the first advertisements after the first time position is reached during the playing back. Other embodiments of this aspect include corresponding systems, apparatus, and computer program products.

Particular embodiments of the subject matter described in this specification can be implemented to realize none, one or more of the following advantages. Advertisements can be targeted to particular content within a video. As a video is played back to a user, advertisements relevant to the content of the video at the point of playback can be presented to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a schematic diagram of a generic computer system.

Like reference numbers and designations in the various drawings indicate like elements.

DETAILED DESCRIPTION

Figure 1:
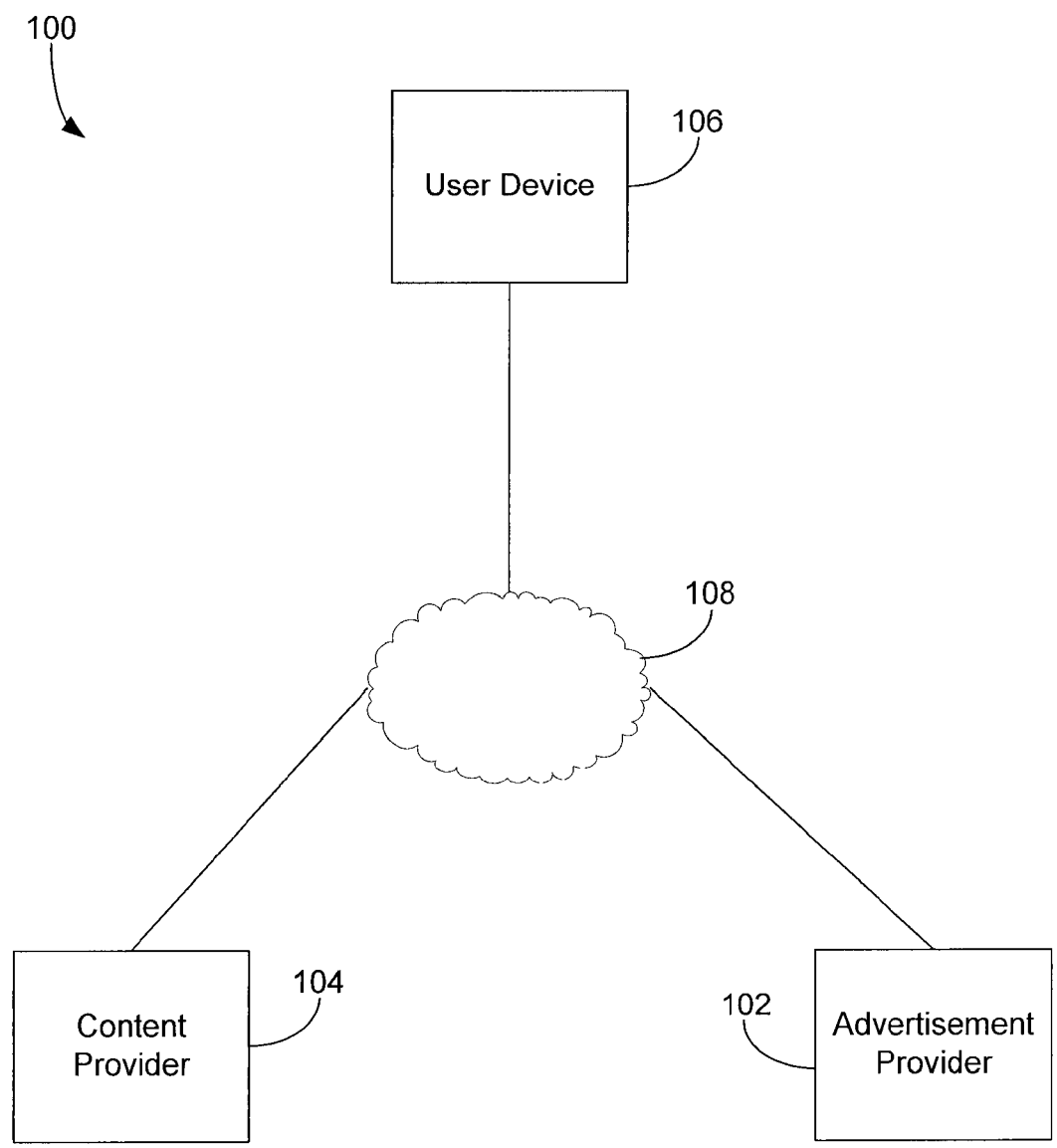
FIG. 1 is a block diagram illustrating an example system for providing advertisement services.

FIG. 1 illustrates an example system 100 for providing advertisement services. In some implementations, the system 100 includes an advertisement provider 102, a content provider 104 and a user device 106. The advertisement provider 102 provides advertisements that can be targeted to content provided by content provider 104. The advertisements are provided to a user device 106, for presentation to a user using the user device 106.

In some implementations, the advertisement provider 102, the content provider 104, and the user device 106 are in data communication across one or more networks 108. The one or more networks 108 can include local area networks, wide area networks, wired networks, wireless networks, the Internet, or any combination of the above.

Content provider 104 can serve or provide access to content to user devices 106. The content may include video files. A video file includes any content that can be visually perceived when played, decoded, or rendered. A video file can include or omit audio content, i.e. content that can be perceived aurally. A video file may be stored or streamed. The content of a video file may represent, for example, a live or recorded television program, a live or recorded theatrical or dramatic work, a music video, a televised event (e.g., a sports event, a political event, a news event, etc.), video voice mail, etc. A video file can be compressed or uncompressed. A video file may be compatible with various video and "container" file formats such as, for example, one or more of ADOBE Flash Video (FLV), MICROSOFT Advanced Streaming Format (ASF), Windows Media Audio (WMA), Windows Media Video (WMV), Audio Video Interleave (AVI), DIVX, Intel Video Technology (IVF), Quicktime movie file extension (MOV), MPEG, Real Media, RealAudio, Real Video, Vivo Video (VIV), OGG, Matroska, 3gp, NUT, MXF, ratDVD, SVI, etc.

The content provider 104 can provide content for streaming and/or download to a user device 106. In some implementations, the content provider 104 includes a web-based user interface, which can be accessed from a web browser application in the user device 106. The web-based user interface can include an embedded media player module for playing audio and/or video. In some implementations, the media player module is implemented using Adobe® Flash®.

The advertisement provider 102 stores information associated with advertisements and provides to advertisers or sponsors access to tools for creating and managing advertising campaigns. An advertisement (or "ad") can be any content designed to promote a product or service, or to otherwise give public notice of some subject matter (e.g., a public service announcement, political advertising, a help wanted ad, etc.). An advertisement can include any combination of text, still graphics or images, moving graphics or images (e.g., video, animation), and audio. The advertisement can take on any of a variety of formats, including a banner, a pop-up, an overlay over other content, a video, an audio recording, for example. The advertisement may be provided by an advertiser or sponsor entity (not shown).

An advertiser can access the advertisement provider 102 to create an advertising campaign, including creating and/or uploading advertisements for the campaign, control the placement of the advertisements in the campaign (e.g., by targeting to particular content or categories), bid for advertisement placements, monitor statistics associated with the advertising campaign, and make payments associated with the advertising campaign. In some implementations, the advertisement provider 102 also stores the advertisements provided or created by the advertiser as well.

A user can access content (e.g., videos) from a user device 106. In some implementations, the user device 106 includes a client application. In some implementations, the client application is a web browser application that can render and present a web-based user interface of the content provider 104. The user device 106 can download and/or stream content to the user device 106 for presentation to a user and/or storage. A user device 106 can include input (e.g., keyboard, mouse, touch-sensitive display, etc.) and output devices (display device, audio output device, etc.). Examples of user devices 106 include desktop computers, notebook computers, tablet computers, network terminals, personal digital assistants (PDA), mobile phones, smartphones, set top boxes, television devices and multimedia players.

Figure 2:
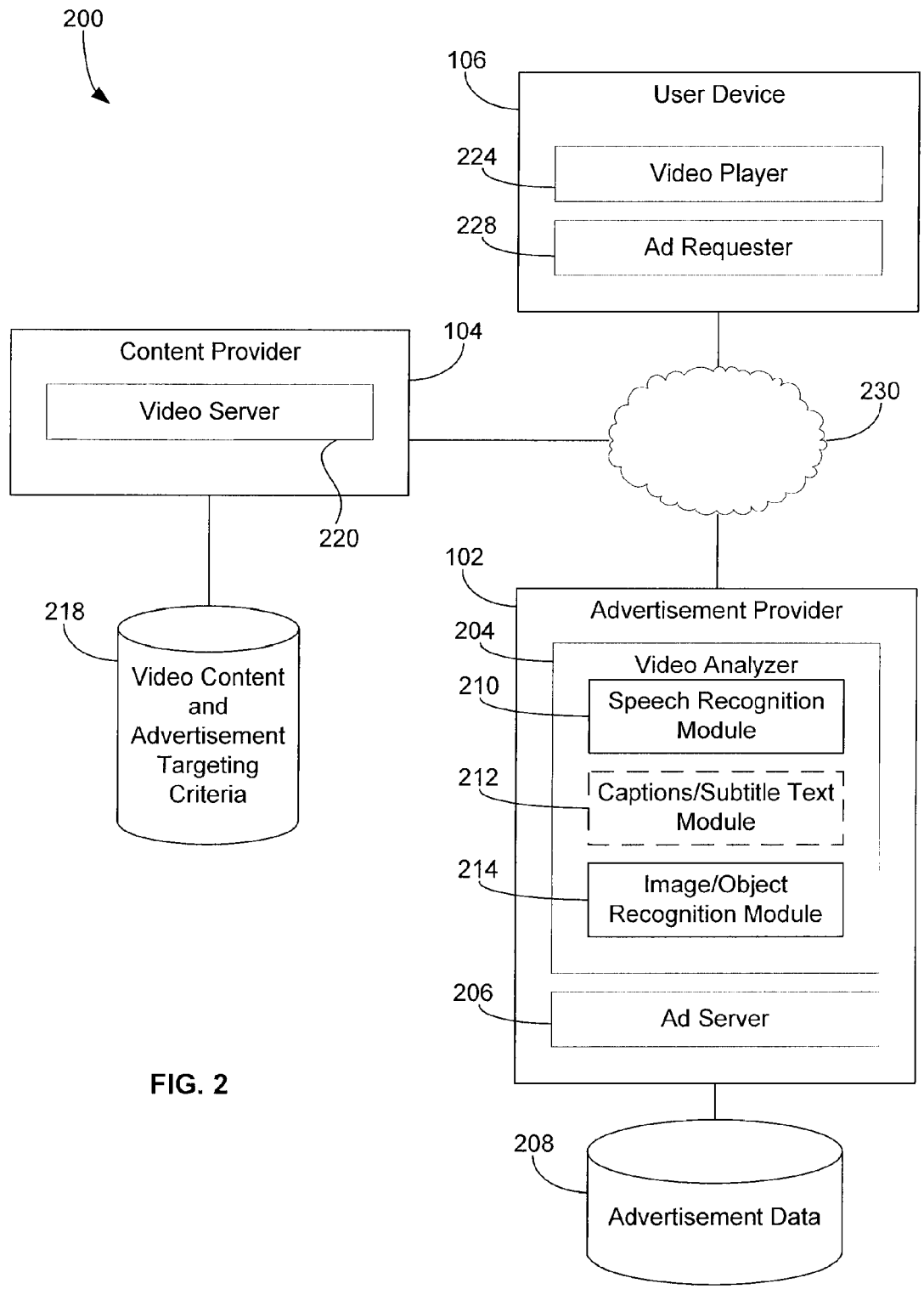
FIG. 2 is a block diagram illustrating an advertisement provider, a content provider, and a user device.

FIG. 2 is a block diagram illustrating examples of an advertisement provider 102, a content provider 104, and a user device 106. In some implementations, the advertisement provider 102 can include an ad server 206 and advertisement data 208. The advertisement data 208 includes advertisements and any associated metadata. In some implementations, the advertisement data 208 is stored in a data store or a database (e.g., MySQL®).

In some implementations, the ad server 206 serves advertisements to a user device 106 through one or more networks 230 (e.g., local area network, wireless network, mobile phone network, the Internet, and so forth). The ad server 206 can serve advertisements targeted to video files served by content provider 104.

In some implementations, the advertisement provider 102 includes a video analyzer 204. The video analyzer 204 can include a speech recognition module 210 for automatically recognizing speech in a video file and converting the speech to text. In some implementations, the video analyzer also includes a module (not shown) for extracting text from closed caption or subtitle data, if any, of a video file. The video analyzer 204 can also include an image/object recognition module 214 for automatically recognizing objects in the visual content of a video file and an optional captions/subtitle text module 212 for extracting text from the closed captions or subtitle data, if any, of a video file. The video analyzer 204 can determine advertisement targeting criteria from the recognized speech, extracted text, and/or the recognized objects.

In some other implementations, the video analyzer 204 and its components are included in the content provider 104. That is, the analysis of video files can be performed by the content provider 104, rather than the advertisement provider 102. In some implementations, the analysis of video files can be done in both the content provider 104 and the advertisement provider 102.

The content provider 104 provides access to video files or streams. In some implementations, the content provider 104 can include a video server 220. In some implementations, the video server 220 serves video files/streams to user device 106 through one or more networks 230 (e.g., local area network, wireless network, mobile phone network, the Internet, and so forth). The content provider 104 can also include video content and associated advertisement targeting criteria 218. The video content can include video files for download or streaming to user devices. In some implementations, the video content and associated advertisement targeting criteria 218 are stored in a data store or a database.

The user device 106 can include a video player 224 and an ad requestor 228. The video player 224 plays back downloaded or streamed videos for display on a display device of the user device 106. The ad requester 228 reads targeting criteria that are received along with a video file or stream and makes requests to an advertisement provider 102 for advertisements that are associated with the read targeting criteria. In some implementations, the user device 106 includes a web browser application (not shown).

In some implementations, the video player 224 and ad requester 228 are modules embedded in a web-based user interface of the content provider 104. The video player 224 and ad requester 228 can be coded in, for example, JavaScript® or any suitable scripting language. When the web-based user interface is rendered in a web browser application at the user device 106, the modules 224, 228 are downloaded from the content provider 104 into the user device 106 and run at the user device 106.

Figure 3:
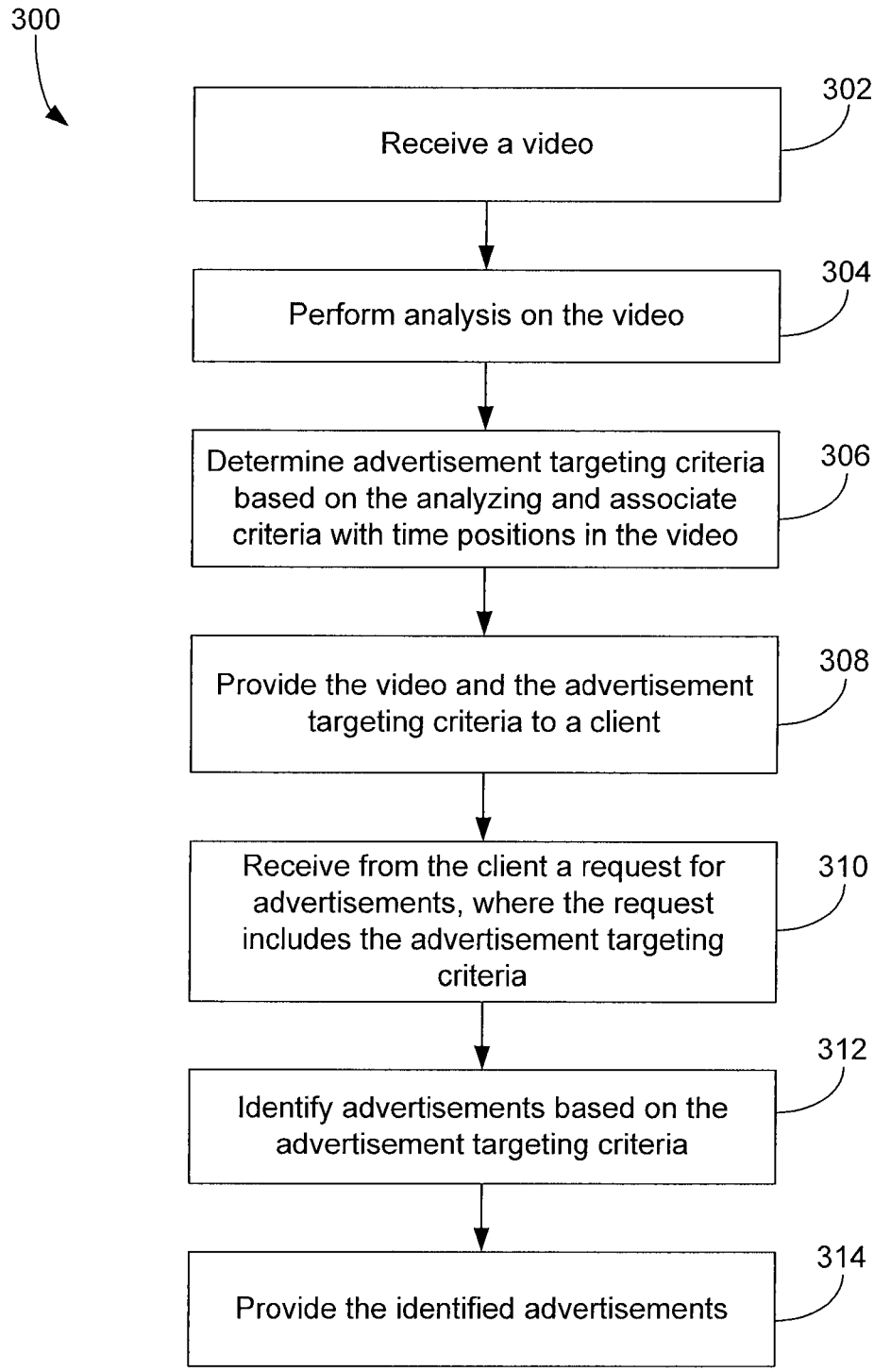
FIG. 3 is a flow diagram illustrating an example process for determining advertisement targeting criteria for a video and providing advertisements based on the advertisement targeting criteria.

FIG. 3 is a flow diagram illustrating an example process 300 for determining advertisement targeting criteria for a video and providing advertisements based on the advertisement targeting criteria. For convenience, the process 300 will be described with reference to a system that performs the process (e.g., the advertisement provider 102 or content provider 104). The process 300, however, can be implemented on a variety of devices, including but not limited to: a computer, mobile phone, personal digital assistant (PDA), media player/recorder, consumer electronic device, set-top box, game console, etc.

The process 300 begins when a video file is received by the system (302). In some implementations, the video file is provided through an upload or a feed by a content provider. In some other implementations, the system performs a crawl at a content provider, finds the video file at the content provider, and downloads the video file. The video file includes visual content and may include audio content.

Analysis is performed by the system on the video file (304). The analysis can include content recognition analysis. Examples of content recognition analysis include automatic speech recognition and automatic object recognition. Examples of automatic speech recognition techniques include techniques based on hidden Markov models, on neural networks, and on dynamic programming. Examples of object recognition techniques include appearance-based object recognition, and object recognition based on local features. An example object orientation technique is disclosed in Lowe, "Object Recognition from Local Scale-Invariant Features," *Proceedings of the Seventh IEEE International Conference on Computer Vision*, Volume 2, pp. 1150-1157 (September 1999), which is incorporated by reference herein.

Automatic speech recognition includes recognizing speech in the audio track of the video file and converting the speech to text. The speech recognition also includes recognizing the time positions in the video in which particular lines or terms in the speech occur. Of course, if the video file does not include audio content, the automatic speech recognition can be skipped.

In some implementations, text from closed caption or subtitle data, if any, of the video file is extracted from the video file. The text from the closed caption/subtitle data can be used as a supplement to or a substitute for automatic speech recognition.

Automatic object recognition includes recognizing objects in the visual content of a video file and the time positions in the video file in which the recognized objects appear. For example, each frame or a sample of the frames of the video file can be analyzed to recognize and identify objects using appearance-based object recognition or object recognition using local features. The objects can include faces, cars, and objects complied in an objects database.

One or more advertisement targeting criteria for the video file are determined based on the analyzing and the criteria are associated with time positions in the video (306). In some implementations, an advertisement targeting criterion provide an indication of a subject matter, topic, or concept that was presented in the video.

In some implementations, the video file is first parsed or analyzed for possible times at which an advertisement can be inserted or transitioned from another advertisement before the advertisement targeting criteria are determined. The possible ad insertion/transition times can be stored as metadata with the video file. Targeting criteria for an ad insertion/transition time can be determined from the content (e.g., text of the speech, recognized objects, etc.) before or after the insertion/transition time.

In some implementations, the advertisement targeting criteria includes one or more tags. The tags can be determined from the recognized speech or objects in the video file. For example, if a term "football" was found in the speech of the video file, the video file can be associated with a tag "football". As another example, if a car was recognized as an object in a frame of the video file, the video file can be associated with a tag "car" or other advertisement targeting criteria related to cars (e.g., the tag "auto," particular brand names or model names of cars).

In some implementations, the analysis of the audio content and the analysis of the video content can be used together. For example, if the object recognition analysis determines that a particular tag can be associated with the video, the speech recognition analysis can increase or decrease the confidence level of that determination, and vice versa.

In some implementations, the targeting criteria can be identified from the textual representation of the speech and/or from the names identifying the recognized objects described above in reference to block 304. An example technique for identifying keywords, topics, or concepts from the text and names is to calculate the well-known term frequency-inverse document frequency ("TF-IDF") for the terms in the text and names and to select the terms having the highest TF-IDF.

An advertisement targeting criterion can be associated with a particular time position in the video file. For example, if the term "football" occurs at the 1:35 mark in the video, a tag "football" can be associated with the 1:35 mark in the video, and if the term "car" occurs at the 5:00 mark in the video, a tag "car" can be associated with the 5:00 mark in the video. In some implementations, multiple tags can be associated with a particular time position. In some implementations, a targeting criterion can be associated with a time interval in the video file, with a beginning time and an ending time. For example, the "football" tag described above can be associated with the interval in the video file starting at the 1:35 mark and ending at the 2:00 mark. An advertisement associated with the tag "football" can be inserted at any time in that range, including at the beginning or ending times.

In some implementations, a targeting criterion (e.g., a tag) is associated with a time position if the number of occurrences of the term and related terms within a predefined interval around that time position is greater than a predefined threshold. For example, if the threshold is 10 occurrences, and within a 1 minute interval around the 1:35 mark in the video (30 seconds before and 30 seconds after), there were 5 occurrences of "football" and 3 occurrences each of related terms of "touchdown" and "field goal," then the term "football" can be associated with the 1:35 mark in the video.

The video and the advertisement targeting criteria are provided, for example, to a user device (308). A request for advertisements is received from, for example, the user device (310). The request for advertisements include one or more of the advertisement targeting criteria. The user device can request one or more advertisements associated with the advertisement targeting criteria for presentation when the video is played back at the user device.

In some implementations, if there is a first targeting criterion (e.g., a tag) associated with a first time position in the video and a second targeting criterion associated with a second time position in the video, a request can be made for advertisements associated with the first targeting criterion and a request can be made for advertisements associated with the second targeting criterion. Alternatively, a combined request for advertisements associated with the first targeting criterion and advertisements associated with the second targeting criterion can be made.

One or more advertisements are identified based on the advertisement targeting criteria (312). The system identifies advertisements that are targeted to the advertisement targeting criteria For example, an advertisement for a car can be identified when the targeting criteria includes a tag "car." The identified advertisements are provided by the system to the requesting device (e.g., the user device) (314). In some implementations, the identified advertisements are provided for presentation at or after the associated time position in the video. For example, advertisements identified from a first targeting criterion associated with a first time position in the video is provided for presentation at or after the first time position, and advertisements identified from a second targeting criterion associated with a second time position in the video is provided for presentation at or after the second time position.

Figure 4:
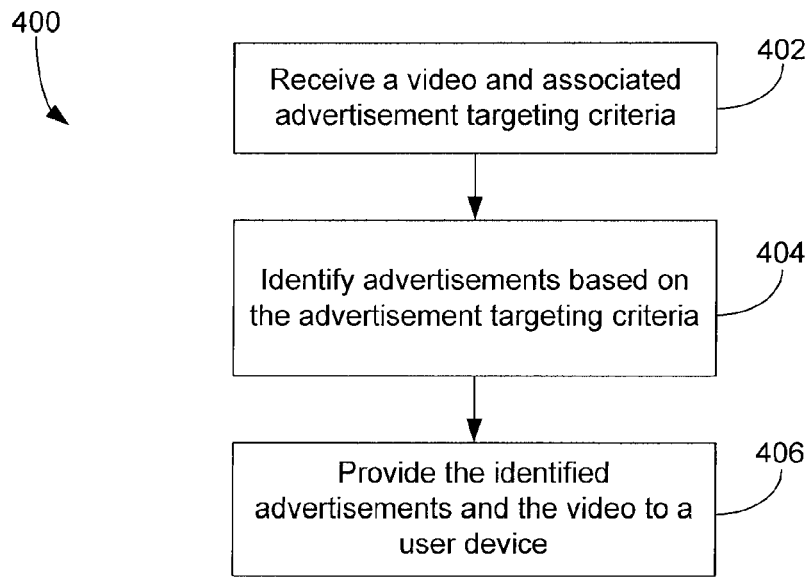
FIG. 4 is a flow diagram illustrating an example process for identifying and presenting advertisements for a video.

FIG. 4 is a flow diagram illustrating an example process 400 for identifying and presenting advertisements for a video. For convenience, the process 400 will be described with reference to a computer system that performs the process (e.g., the advertisement provider 102 or content provider 104). The process 400, however, can be implemented on a variety of devices, including but not limited to: a computer, mobile phone, personal digital assistant (PDA), media player/recorder, consumer electronic device, set-top box, game console, etc.

The system can receive a video that already has associated advertisement targeting criteria that are associated with particular time positions in the video. For example, an advertisement provider can receive a video from a content provider, where the content provider already has performed content recognition analysis on the video. In some implementations, the video can be associated with one or more tags, where each tag can be associated with a respective time position in the video. For example, a first tag can be associated with a first time position in the video, and a second tag can be associated with a second time position in the video.

Process 400 begins when a video file or stream and one or more advertisement targeting criteria associated with the video file or stream is received (402). At least one of the advertisement targeting criteria is associated with a time position in the video. In some implementations, the targeting criteria includes a criterion associated with one time position in the video and another criterion associated with another time position in the video.

One or more advertisements are identified based on the received advertisement targeting criteria (404). In some implementations, a group of one or more advertisements are identified based on a first criterion associated with one time position in the video, and another group of one or more advertisements are identified based on a second criterion associated with another time position in the video.

The identified advertisements and the video are provided to a requesting device (e.g., a user device) (406). In some implementations, the system can transmit the identified advertisements and the video to a user device together as one or more files. In some other implementations, the advertisements and the video are streamed to the user device. In some implementations, the advertisements are provided for presentation at or after particular time positions in the video. For example, advertisements identified from a first targeting criterion associated with a first time position in the video is provided for presentation at or after the first time position, and advertisements identified from a second targeting criterion associated with a second time position in the video is provided for presentation at or after the second time position.

Figure 5:
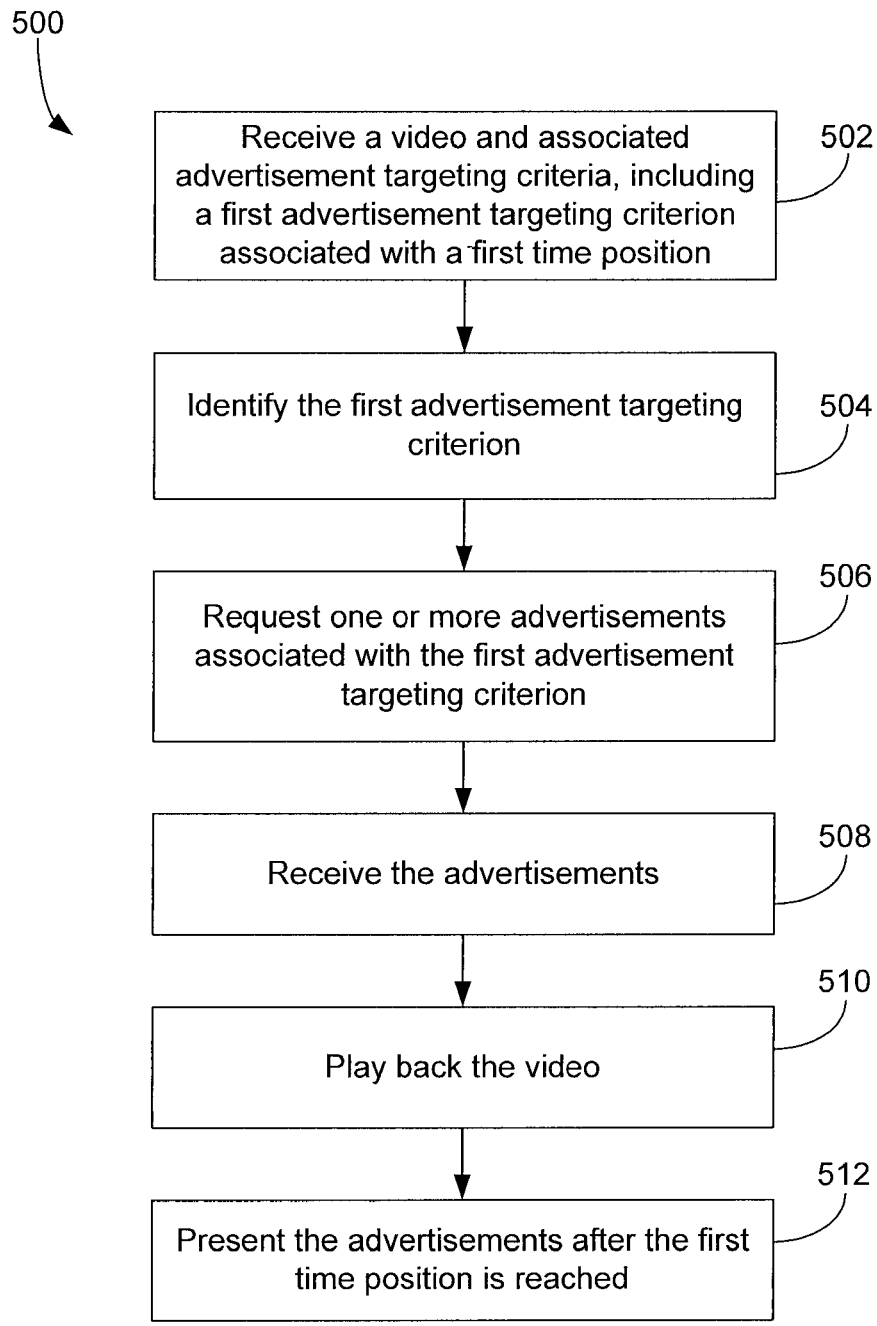
FIG. 5 is a flow diagram illustrating an example process for presenting advertisements.

FIG. 5 is a flow diagram illustrating an example process 500 for presenting advertisements. For convenience, the process 500 will be described with reference to a computer system that performs the process (e.g., the user device 106). The process 500, however, can be implemented on a variety of devices, including but not limited to: a computer, mobile phone, personal digital assistant (PDA), media player/recorder, consumer electronic device, set-top box, game console, etc.

Process 500 begins when a video and associated advertisement targeting criteria are received (502). The video can be received as a video file downloaded to the system or as a video stream to the system. The targeting criterion can be associated with a respective time position in the video. In some implementations, the advertisement targeting criteria includes one or more tags, where each tag can be associated with a respective time position in the video. In some implementations, the advertisement targeting criterion includes a first targeting criterion associated with a first time position in the video and a second advertisement targeting criterion associated with a second time position in the video.

The first advertisement targeting criterion is identified from the advertisement targeting criteria (504). One or more advertisements associated with the first advertisement targeting criterion are requested (506). The advertisements are requested for presentation at or after the first time position. The system can send a request for advertisements to an advertisement provider (e.g., advertisement provider 102), for example. The request can include the advertisement targeting criteria associated with the first time position and the desired number and/or duration of advertisements. The system receives the requested advertisements (508).

In some implementations, the video is played back at the system (510). The video can be played back in a video player module in a web-based user interface. After the first time position in the video is reached during the playing back of the video, the received advertisements can be presented (512). In some implementations, the presentation of the received advertisements can be started when the first time position is reached or afterwards in the playback of the video.

The advertisements are presented as the video is played back based on the associated targeting criteria and the time positions with which the targeting criteria are associated. For example, if a tag "football" is associated with the 1:35 mark in the video, then the received advertisements associated with the tag "football" are presented when the 1:35 mark in the video is reached or afterwards.

In some implementations, presentation of advertisements associated with a targeting criterion can be cut short by presentation of advertisements associated with another targeting criterion. Continuing with the example above, if advertisements associated with a different tag are to be presented at the 2:00 mark, and there are still advertisements associated with "football" to be presented, then the presentation of the "football" advertisements can be cut short. As an example, the subject matter of a video can be football-related from the 2:00 mark, and the subject matter changes to MP3 and media player devices at the 3:00 mark. Four 30-second football ads can be scheduled for presentation in sequence, starting at the 2:00 mark, as the video is played back to the user, and an MP3 player ad can be scheduled for presentation at the 3:00 mark in the video. As the video is played back and the playback reaches the 2:00 mark, the sequence of football ads can be shown to the side. When the video playback reaches the 3:00 mark, the sequence of football ads are not completed but the sequence can be cut short and the MP3 ad can be shown. Alternatively, the MP3 player ad can be postponed until the full sequence of football ads is shown.

In some implementations, the advertisements to be presented with the playback of the video can be requested all at once, when the playback of the video begins. For example, the system can identify the targeting criteria and their associated time positions in the video. The system makes a request for advertisements associated with the identified targeting criteria. In some other implementations, a request for advertisements only requests advertisements for a particular time position, rather than the whole video. For example, the system can identify the targeting criteria associated with a second time position in the video and make a request for advertisements associated with these identified targeting criteria. The system receives the requested advertisements and presents them after the second time position in the video is reached during the playback of the video.

Figure 8:
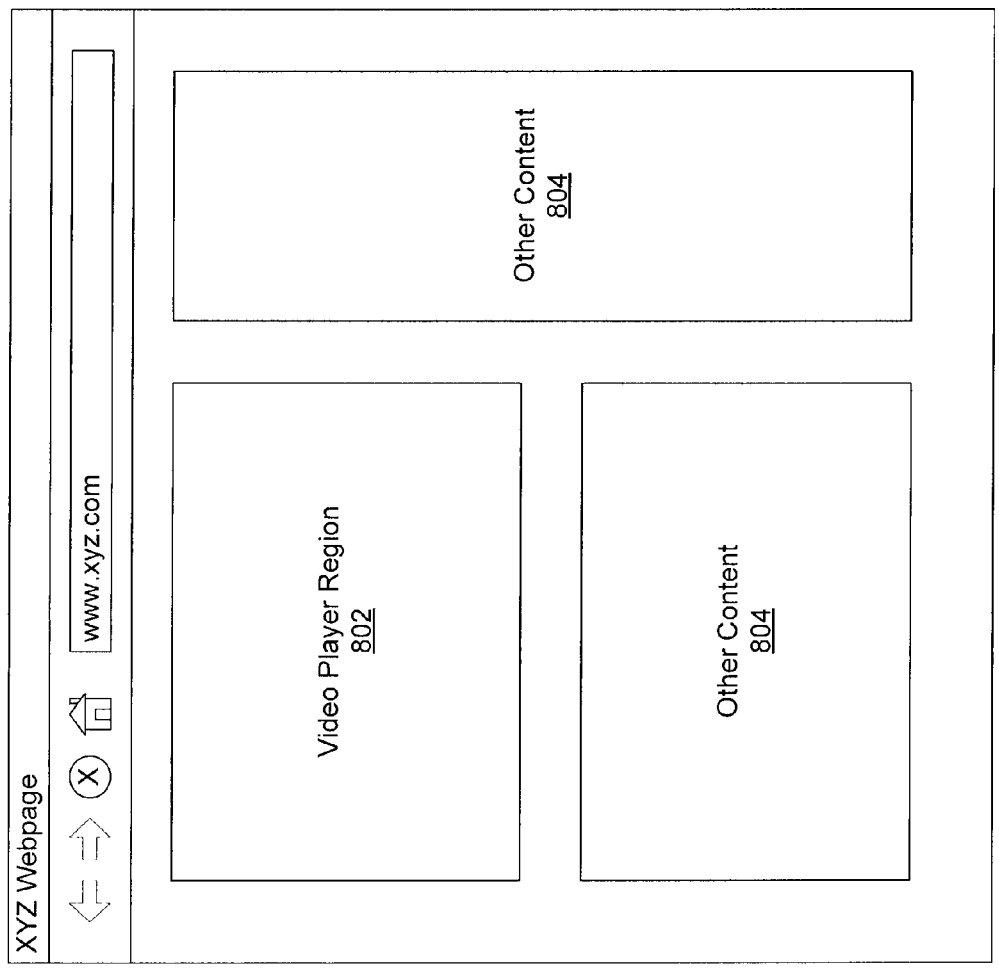
FIG. 8 is a diagram illustrating an example user interface in which a video can be presented to a user.

FIG. 8 illustrates an example user interface in which a video can be presented to a user. Interface 800 illustrates an example web page displayed in a web browser. The web page includes a video player region 802 and one or more regions for displaying other content. The video player region can include an embedded video player application or plug-in for playing a video. The video player application can include controls for the player (e.g., volume control, progress bar, play/pause button, full screen toggle, etc.) and space for displaying information about a video and advertisements. Other content, such as advertisements, links to related videos, information about the video being played back, etc. can be displayed in the other content region(s) 804.

In some implementations, the advertisements identified for a video in the processes described above are presented in the other content region(s) 804 while the video is playing in the video player region 802. For example, while the video is displayed in the video player region 802, the advertisements can be presented in an other content region 804. As the video playback progresses, different advertisements can be presented, and the subject matter of the presented advertisements can change in accordance with the advertisement targeting criteria associated with various time positions in the video. Advertisements that can be presented in the other content region 804 can include text advertisements, graphical advertisements, banner advertisements, video advertisements, and so forth.

In some other implementations, the advertisements are inserted between portions of the video; the advertisements are presented as part of the playback of the video, similar to commercials presented during commercial breaks in television programming. An advertisement slot can be inserted between portions of the video, at a particular time position in the video. Advertisements associated with the targeting criteria for that position can be presented in the advertisement slot. In other words, the advertisements are presented in-stream with the playback of the video. For example, video advertisements can be presented in interstitial advertisement slots inserted into the video. Example techniques for inserting interstitial advertisement slots into a video are disclosed in, for example, U.S. patent application Ser. No. 11/550,388, titled "Using Viewing Signals in Targeted Video Advertising," filed Oct. 17, 2006, which is incorporated by reference herein in its entirety.

Figure 6:
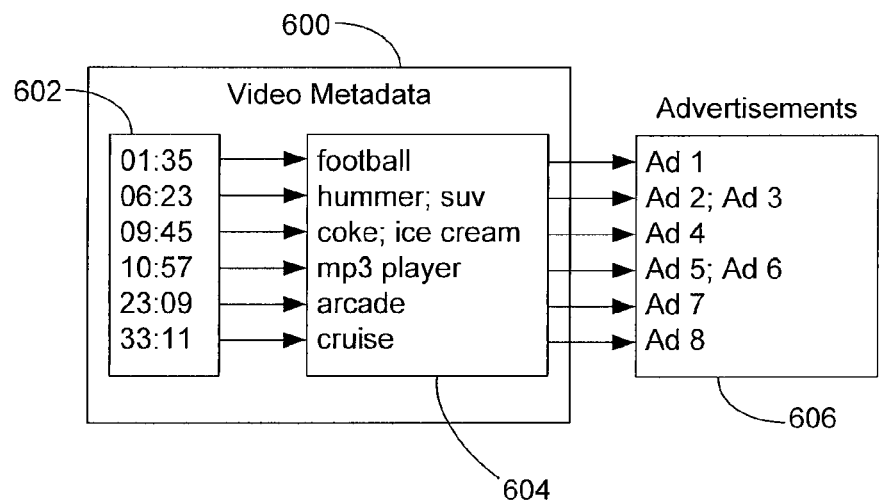
FIG. 6 is a diagram illustrating example advertisement targeting criteria associated with a video.

FIG. 6 is a conceptual diagram illustrating example advertisement targeting criteria 600 and advertisements 606. Advertisement targeting criteria 600 of a video file can include one or more tags 604. The one or more tags can be associated with a respective time position 602 in the video file. For example, the tag "football" can be associated with the 1:35 position in the video. A time position can have multiple tags, and a tag can be associated with multiple time positions. For example, the tags "coke" and "ice cream" are associated with the 9:45 position in the video.

In some implementations, when a video file is streamed or played, the video advertisement targeting criteria 600 of the video file can be read and the advertisement targeting criteria identified. Advertisements 606 targeted to the identified advertisement targeting criteria can be requested from an advertisement provider (e.g., advertisement provider 102). As the video file is played back at the user device and the playback of the video file reaches or passes a time position that is associated with a targeting criterion, advertisements targeted to that targeting criterion can be presented to a user at the user device. For example, an Ad 1 that is associated with football (e.g., an advertisement for a football game on TV or a football video game) can be presented at or after the 1:35 mark in the video, which is associated with the tag "football." As another example, Ad 5 and Ad 6 that are associated with multimedia players can be presented at or after the 10:57 mark in the video, which is associated with the tag "mp3 player."

FIG. 7 is a schematic diagram of a generic system 700 for practicing operations described in association with processes 300, 400, or 500. The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. Such executed instructions can implement one or more components of system 700, for example. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 and storage device 730 are computer-readable mediums, such as volatile or non-volatile memory that stores information within the system 700 or a CD or DVD, USB flash drive, etc. The memory 720 could store, for example, data structures representing advertisement data 208 or video content and advertisement targeting criteria 218, for example. In some implementations, the storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

The implementations above were described in reference to a client-server system architecture. It should be appreciated, however, that system architectures other than a client-server architecture can be used. For example, the system architecture can be a peer-to-peer architecture.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A computer-implemented method, the method comprising;
  identifying a plurality of advertisement targeting criteria based on content of a video stream or file, in which each advertisement targeting criterion describes content of a respective portion of the video at a respective time position in the video;
  associating a first advertisement targeting criterion with a first time position in the video, wherein the first advertisement targeting criterion is selected for association with the first time position in the video based on a determination that the first time position occurs within a time interval of a plurality of non-overlapping time intervals of the video wherein each time interval is associated with a respective plurality of the identified advertisement targeting criteria greater than a predetermined threshold that are the same as, or related to, the first advertisement targeting criterion; and providing one or more first advertisements based on the first advertisement targeting criterion for presentation at or after the first time position in the video.

2. The method of claim 1 wherein providing one or more first advertisements comprises:

providing the video and the first advertisement targeting criterion to a user device;

receiving from the user device a request for advertisements, the request including the first advertisement targeting criterion;

identifying one or more advertisements based on the first advertisement targeting criterion included in the request; and providing the identified advertisements to the user device.

3. The method of claim 1 wherein identifying the plurality of advertisement targeting criteria comprises analyzing audio content of the video.

4. The method of claim 3 wherein analyzing the audio content of the video comprises applying speech recognition to the audio content of the video to identify speech in the audio content of the video; and determining one or more advertisement targeting criteria from the identified speech.

5. The method of claim 1 wherein identifying the plurality of advertisement targeting criteria comprises analyzing visual content of the video.

6. The method of claim 5 wherein analyzing the visual content of the video comprises:

applying automatic object recognition to the visual content of the video to identify one or more objects in the visual content of the video; and determining one or more advertisement targeting criteria from the identified objects.

7. The method of claim 1 wherein identifying the plurality of advertisement targeting criteria comprises:

extracting textual data from the video, wherein the textual data represents speech in the video; and determining one or more advertisement targeting criteria from the textual data.

8. A system comprising:

a non-transitory computer-readable medium having instructions stored thereon; and one or more processors programmed to execute the instructions to perform operations comprising:

identifying a plurality of advertisement targeting criteria based on content of a video stream or file, in which each advertisement targeting criterion describes content of a respective portion of the video at a respective time position in the video;

associate a first advertisement targeting criterion with a first time position in the video, wherein the first advertisement targeting criterion is selected for association with the first time position in the video based on a determination that the first time position occurs within a time interval of a plurality of non-overlapping time intervals of the video wherein each time interval is associated with a respective plurality of the identified advertisement targeting criteria greater than a predetermined threshold that are the same as, or related to, the first advertisement targeting criterion; and provide one or more first advertisements based on the criterion for presentation at or after the first time position in the video.

9. A storage device having instructions stored thereon that, when executed by data processing apparatus, are operable to cause the data processing apparatus to perform operations comprising;

identifying a plurality of advertisement targeting criteria based on content of a video stream or file, in which each advertisement targeting criterion describes content of a respective portion of the video at a respective time position in the video described by the criterion;

associating a first advertisement targeting criterion with a first time position in the video, wherein the first advertisement targeting criterion is selected for association with the first time position in the video based on a determination that the first time position occurs within a time interval of a plurality of non-overlapping time intervals of the video wherein each time interval is associated with a respective plurality of the identified advertisement targeting criteria greater than a predetermined threshold that are the same as, or related to, the first advertisement targeting criterion; and providing one or more first advertisements based on the first advertisement targeting criterion for presentation at or after the first time position in the video.

10. The system of claim 8 wherein providing one or more first advertisements comprises:

providing the video and the first advertisement targeting criterion to a user device;

receiving from the user device a request for advertisements, the request including the first advertisement targeting criterion;

identifying one or more advertisements based on the first advertisement targeting criterion included in the request; and providing the identified advertisements to the user device.

11. The system of claim 8 wherein identifying the plurality of advertisement targeting criteria comprises analyzing audio content of the video.

12. The system of claim 11 wherein analyzing the audio content of the video comprises applying speech recognition to the audio content of the video to identify speech in the audio content of the video; and determining one or more advertisement targeting criteria from the identified speech.

13. The system of claim 8 wherein identifying the plurality of advertisement targeting criteria comprises analyzing visual content of the video.

14. The system of claim 13 wherein analyzing the visual content of the video comprises:

applying automatic object recognition to the visual content of the video to identify one or more objects in the visual content of the video; and determining one or more advertisement targeting criteria from the identified objects.

15. The system of claim 8 wherein identifying the plurality of advertisement targeting criteria comprises:

extracting textual data from the video, wherein the textual data represents speech in the video; and determining one or more advertisement targeting criteria from the textual data.

16. The storage device of claim 9 wherein providing one or more first advertisements comprises:

providing the video and the first advertisement targeting criterion to a user device;

receiving from the user device a request for advertisements, the request including the first advertisement targeting criterion;

identifying one or more advertisements based on the first advertisement targeting criterion included in the request; and providing the identified advertisements to the user device.

17. The storage device of claim 9 wherein identifying the plurality of advertisement targeting criteria comprises analyzing audio content of the video.

18. The storage device of claim 17 wherein analyzing the audio content of the video comprises:

applying speech recognition to the audio content of the video to identify speech in the audio content of the video; and determining one or more advertisement targeting criteria from the identified speech.

19. The storage device of claim 9 wherein identifying the plurality of advertisement targeting criteria comprises analyzing visual content of the video.

20. The storage device of claim 19 wherein analyzing the visual content of the video comprises:

applying automatic object recognition to the visual content of the video to identify one or more objects in the visual content of the video; and determining one or more advertisement targeting criteria from the identified objects.

21. The storage device of claim 9 wherein identifying the plurality of advertisement targeting criteria comprises:

extracting textual data from the video, wherein the textual data represents speech in the video; and determining one or more advertisement targeting criteria from the textual data.

\* \* \* \* \*